Figure 1:
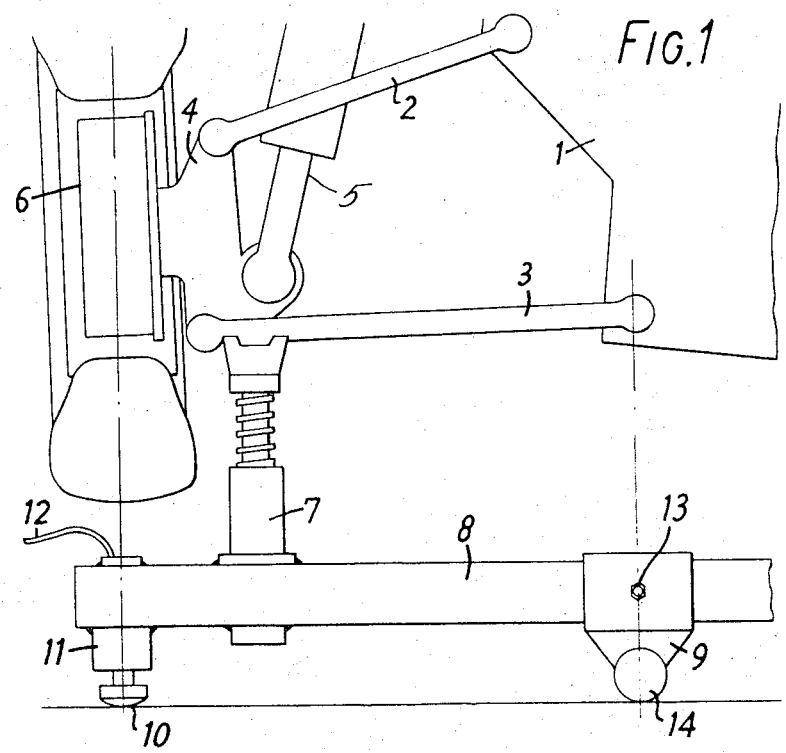

United States Patent [19]
Merrilees

[11] 3,780,592
[45] Dec. 25, 1973

[54] WHEEL BALANCING APPARATUS
[75] Inventor: James Drummond Merrilees, Bristol, England
[73] Assignee: Bendix Westinghouse Limited, Bristol, England
[22] Filed: July 3, 1972
[21] Appl. No.: 268,458

[30] Foreign Application Priority Data
July 22, 1971 Great Britain .................... 34,458/71

[52] U.S. Cl. ................................................ 73/457
[51] Int. Cl. ............................................ G01m 1/28
[58] Field of Search .............................. 73/457, 462

[56] References Cited
UNITED STATES PATENTS
3,461,729   8/1969   Haynes ................................ 73/457

FOREIGN PATENTS OR APPLICATIONS
951,269   3/1964   Great Britain ........................ 73/457

Primary Examiner—James J. Gill
Attorney—Roberts B. Larson et al.

[57] ABSTRACT

A vehicle suspension supporting transducer arrangement is proposed for on-car wheel balancing in which the transducer is incorporated in one end of a rigid lever on an intermediate position of which a suspension jack is mounted and the other end of the lever is effectively adjustable to positioning of the transducer immediately beneath the wheel centre and of the said other end beneath the point about which cyclic wheel static unbalance forces can be considered to act so that the supporting arrangement reacts substantially complementary forces through the transducer.

3 Claims, 2 Drawing Figures

WHEEL BALANCING APPARATUS

This invention relates to wheel balancing apparatus and relates more especially to wheel unbalance signal producing apparatus for supporting the suspension of a wheel the balance of which is to be tested.

In the specification of co-pending U.S. Pat. Application Ser. No. 148,336, there is described and claimed wheel balancing apparatus which operates to test a wheel for unbalance whilst the wheel is being rotated to accentuate forces due to the unbalance, the apparatus including support means for rigidly supporting a wheel mounting carrying a rotatably mounted wheel to be tested and the support means including a force transducer operable to produce a wheel unbalance-related cyclic signal.

Although not restricted thereto, the above described apparatus is concerned primarily with balancing of vehicle-mounted wheels. This enables wheels to be tested and collected for unbalance without detaching the wheels from the vehicle.

According to the present invention there is provided wheel unbalance signal producing apparatus comprising a vehicle suspension supporting device carried by a lever which in operation is itself supported at support locations displaced in opposite directions along it with respect to the position thereon of the supporting device, one of said support locations incorporating a transducer and the relative positions of the support device and at least one said location being selectable to enable cyclic forces due to static unbalance of a rotating wheel on a suspension supported by the device to be transferred to the transducer without appreciable transfer factor.

The term transfer factor is to be taken to mean if appreciable, an appreciable modification amplification or attenuation of cyclic forces as transmitted from the wheel via the vehicle suspension to the transducer.

Preferably, the apparatus is arranged to be operated with the transducer beneath the centre of a wheel to be tested and in fixed relationship to the supporting device, the other said support position being directly beneath the notional centre about which wheel and suspension swing occurs in the resting position thereof on the support means.

Figure 2:
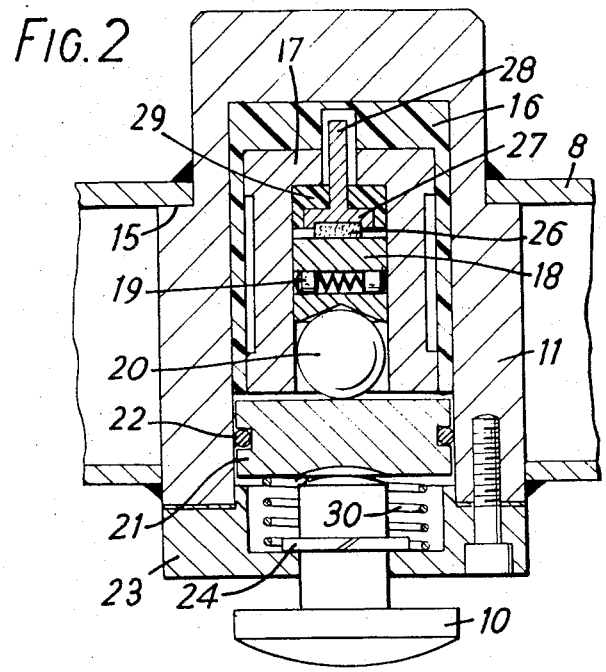

In order that the invention may be more clearly understood and readily carried into effect, the same will be further described by way of example with reference to the accompanying drawing of which, FIG. 1, illustrates in diagrammatical manner, a support means in accordance with one example of the invention and FIG. 2 shows in much more detail the force transducer to be referred to.

The drawing shows the support means suitably positioned to support a vehicle suspension of typical configuration. The main vehicle cross member is denoted by the reference 1 and this carries a pair of swinging arms or wishbones 2 and 3, the outward ends of which are pivotally attached to the wheel axle assembly between which and the vehicle chassis is a normal telescopic spring and/or shock absorber denoted by reference 5. The wheel and brake-drum assembly is denoted generally by reference 6 and a suspension supporting device in the form of a manually-adjustable jack 7 is positioned beneath the lower swinging arm or wishbone 3.

The supporting means in accordance with the present embodiment of the invention consists of the supporting device 7 carried by a bar 8 of a rectangular steel lever assembly which has feet 14 formed at the ends of a transversely extending rod carried by a slideable box section member 9, the precise location of which in relation to the lever is adjustable to suit different vehicle suspensions and the adjustment can be fixed by a set-bolt 13. At the outer end of 8 there is a further support foot 10 above which there is incorporated a piezo electric crystal force transducer denoted by reference 11 and having a lead 12 for connection to the associated electronic apparatus. In the presently preferred embodiment, the position of the jack 7 and the support foot 10 are fixed by welding in apertures in the lever. The bar 8 is of hollow section and is of such stout form that it has a natural frequency far above that at which the system is required to operate so not to introduce undesired signal components.

The construction of the force transducer is shown in greater detail in FIG. 2 from which it is seen that the body 11 of the transducer has a shoulder 15 which locates within the internal surface of the upper face of the rectangular tubular bar lever 8. The body 11 is of mild steel and is provided with an internal cylindrical bore within which is fitted an insulating sleeve member 16. The latter is itself provided with an internal bore fitted with a brass insert 17 which carries an internal plunger 18 of conducting material and between which and the insert 17 good electrical contact is maintained by opposing spring-loaded contact plugs 19 in a transverse drilling. The lower surface of the plunger 18 is provided with a conical concave shape to locate positively with a compression ball 20 which rests upon the upper surface of a mild steel seal member having an O-ring seal 22. The foot 10 has a stem which is retained within the lower body cap 23 of the transducer by a cir-clip 24, the stem being a sliding fit in the cap 23 to enable positive engagement with the lower face of seal 21.

The plunger 18 forms the lower contact with a piezo electric crystal 26 and an upper silver contact 27 is provided having a stalk 28 and being retained in an insulator 29 within the bore of the conducting insert 17. Electrical leads are not shown in FIG. 2 but are connected to stalk 28 and the conducting insert 17 and brought out through the upper projecting part of the transducer body. It is observed that a spring 30 is provided between the cap 23 and the seal 21 so that the whole assembly within the body is urged upwards leaving only the foot 10 free for vertical movement so that cyclic forces are readily transmissible thereby via seal 21, compression ball 20 and plunger 18 to the crystal 26 which thereby generates a cyclic electrical signal.

In operation, the support means is assumed to be employed after suitable calibration in conjunction with the electronic apparatus such as described in the above mentioned co-pending Patent Application. The support means is placed beneath the vehicle suspension which carries a wheel the balance of which is to be tested and in such a position that the support foot 10 rests as precisely as possible beneath the centre of the wheel. The member 9 carrying the support feet 14 is adjusted either previously or at this time to suit the configuration of the suspension of the vehicle in question, in that it rests beneath a point of the suspension about which the cyclic wheel forces may be assumed to act in the position it takes up when the suspension is lowered onto the jack 7 with the wheel 6 off the ground.

The wheel is caused to rotate by a spinner which is brought up to bear upon the wheel and as the wheel susbsequently freely rotates any static unbalance produces a rotating force vector the vertical component of which is transferred to the transducer 11 and this transducer therefore experiences a cyclically fluctuating force component superimposed upon the steady loading due to the proportion of the vehicle weight which is carried by the jack 7. The transducer therefore produces a cyclically fluctuating electrical signal to which the electronic apparatus connected thereto is responsive to indicate the magnitude of the rotating force vector when the wheel speed passes through a predetermined narrow angular speed band.

With the apparatus set up as described, it will be appreciated that since 9 is below the point about which or the cyclic wheel forces are assumed to act (which it is shown as such, is not necessarily the inner pivot of the arm 3) and the transducer 11 is beneath the centre of the wheel, there is negligible transfer factor involved in the transfer to the transducer of the cyclic force vector generated by the rotating wheel. This is because the position of the jack 7 is common to substantially complementary systems of forces associated with the wheel suspension and associated with the lever 8 respectively.

As a result of the absence of such transfer factor, with the support means appropriately adjusted to the vehicle concerned, the only outstanding requirement as far as static unbalance correction is concerned is to apply a correction for wheel diameter before applying balance weights on the basis of the force signal produced by the transducer. Wheel diameter is normally a factor which is readily applied by means of a suitable potentiometer in the electronic apparatus.

The support means as described in the foregoing is capable of being employed with a wide range of vehicle suspension configurations and dimensions and in spite of the wide range of variables inherent therein, can produce a cyclic signal which requires only a correction factor corresponding to wheel diameter.

Whilst the present invention is not primarily concerned with means for indicating dynamic unbalance in vehicle wheels, the lever assembly may if desired have mounted thereon a suitable moving coil or moving magnet arrangement for additionally producing a signal due to transverse wheel movement corresponding to dynamic unbalance.

Having thus described our invention, what we claim is:

1. Wheel unbalance signal producing apparatus comprising a vehicle suspension supporting device carried by a lever which in operation is itself supported by support elements displaced in opposite directions along it with respect to the position thereon of the supporting device, a transducer located between the lever and one of the support elements to respond to forces therebetween, and at least one of said support elements being adjustable along the length of the lever toward and away from said supporting device, whereby cyclic forces due to static unbalance of a rotating wheel on a suspension supported by the device will be transferred to the transducer without appreciable transfer factor.

2. Wheel unbalance signal producing apparatus comprising a vehicle suspension supporting device carried by a lever which in operation is supported by support elements, a transducer located to respond to forces between one of said support elements and said lever, said support elements being located at support locations so displaced in opposite directions along said lever with respect to the position thereon of the supporting device that said transducer is subject without appreciable transfer factor to transferred cyclic forces due to static wheel unbalance.

3. Wheel unbalance signal producing apparatus as claimed in Claim 1, the support element associated with the transducer being mounted on the lever such as to be positioned in operation beneath the vehicle wheel and the other support element being adjustable to a position beneath a point of the wheel suspension about which said cyclic forces may be considered to act.

* * * * *